(No Model.)
H. C. WILLIAMS.
PNEUMATIC TIRE.
No. 582,511. Patented May 11, 1897.
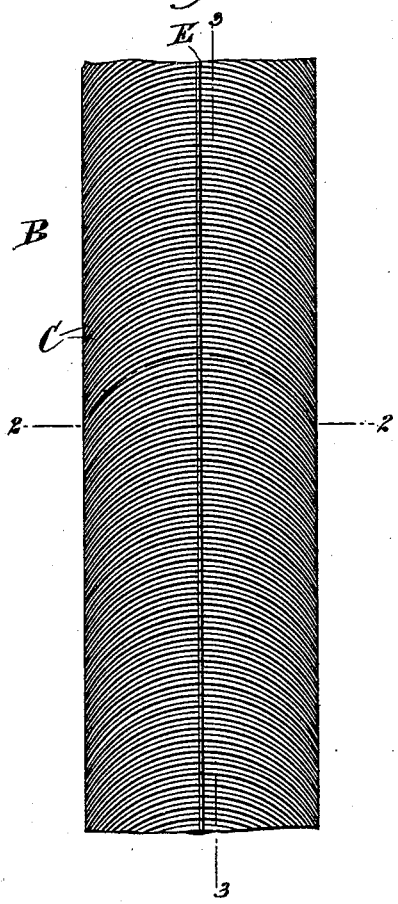
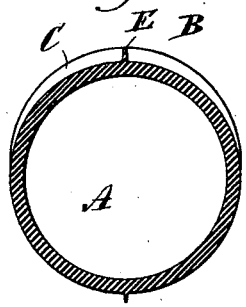
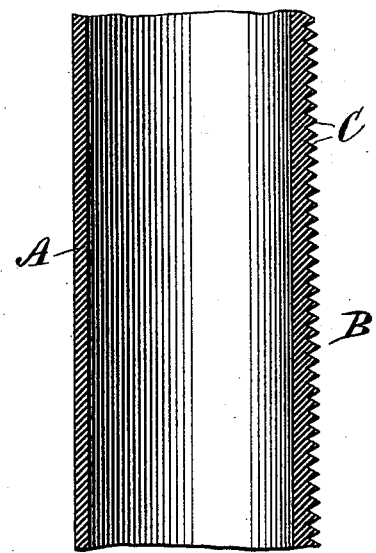
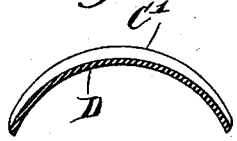
WITNESSES:
Edward Thorpe
Rev. G. Hoskin
INVENTOR
H. C. Williams
BY
ATTORNEYS.

UNITED STATES PATENT OFFICE.

HENRY CLAY WILLIAMS, OF TRENTON, NEW JERSEY.

PNEUMATIC TIRE.

SPECIFICATION forming part of Letters Patent No. 582,511, dated May 11, 1897.

Application filed May 21, 1896. Serial No. 592,386. (No model.)

*To all whom it may concern:*

Be it known that I, HENRY CLAY WILLIAMS, of Trenton, in the county of Mercer and State of New Jersey, have invented a new and Improved Pneumatic Tire, of which the following is a full, clear, and exact description.

The object of the invention is to provide a new and improved pneumatic tire designed for use on bicycles and other vehicles and arranged to form a yielding flexible tread, which insures an easy riding, prevents slipping, and assists in the forward propulsion of the wheel.

The invention consists principally of a tread having curved ribs terminating on the sides of the tire.

The invention also consists of certain parts and details and combinations of the same, as will be fully described hereinafter and then pointed out in the claim.

Reference is to be had to the accompanying drawings, forming a part of this specification, in which similar characters of reference indicate corresponding parts in all the figures.

Figure 1 is a partial plan view of the improvement. Fig. 2 is a cross-section of the same on the line 2 2 of Fig. 1. Fig. 3 is a longitudinal section of the same on the line 3 3 of Fig. 1, and Fig. 4 is a cross-section of a modified form of the improvement.

The pneumatic tire is provided with a rubber tube A, formed on its periphery with a tread B, composed of ribs C, curved to the form shown in Fig. 1, to terminate at the ends on the sides of the tube A, as plainly indicated in Fig. 2, the said ribs decreasing in depths from the center toward the sides to finally vanish at their points in the sides of the tube A.

The ribs C are preferably V-shaped in cross-section, as plainly indicated in Fig. 3, and arranged parallel one to the other, as shown in Fig. 1.

In making the tire by means of molds a longitudinal ridge E is produced, formed by the surplus material of the tube A being forced out at the joints of the mold, so that the ridge extends centrally across the ribs C, as shown in Figs. 1 and 2. Now it will be seen that when the pneumatic tire is in use and the ribs reach the ground and are compressed the said ribs will lean toward each other, and in recoiling on leaving the ground will assist in the forward propulsion of the wheel. It will further be seen that as the tread is formed of such yielding ribs it is evident that an easy riding is assured and at the same time lateral slipping of the wheel is prevented, owing to the form and shape of the ribs.

If desired, the tread may be made separate from the tube A, as shown in Fig. 4, and in this case a strip D is formed on its surface with the curved ribs C', and this strip is cemented or otherwise secured to the tube forming the tire.

Having thus described my invention, I claim as new and desire to secure by Letters Patent—

A tire, the tread of which is formed with a series of curved ribs parallel to each other, each rib being highest at the longitudinal center of the tire and being extended up each side of the tire and being regularly tapered so as to have an arc-shaped edge which intersects or runs into the cross-sectional arc of the tire, each rib extending across the longitudinal line of the tire and being disposed diagonally with relation to said line, and the tire also having a rib running along the longitudinal line of its tread and crossing the highest portions of the ribs, substantially as described.

HENRY CLAY WILLIAMS.

Witnesses:
 THEO. G. HOSTER,
 JNO. M. RITTER.